United States Patent [19]

Motoyama et al.

[11] Patent Number: 5,095,873
[45] Date of Patent: Mar. 17, 1992

[54] FUEL INJECTION SYSTEM AND METHOD FOR ENGINE

[75] Inventors: Yu Motoyama; Ryusuke Kato, both of Iwata, Japan

[73] Assignee: Yamaha Hatsudoki Kabushiki Kaisha, Iwata, Japan

[21] Appl. No.: 580,130

[22] Filed: Sep. 10, 1990

[30] Foreign Application Priority Data

Sep. 13, 1989 [JP] Japan ................ 1-237857
Jun. 12, 1990 [JP] Japan ................ 2-153121

[51] Int. Cl.⁵ .......................................... F02B 5/00
[52] U.S. Cl. ................................ 123/305; 123/339; 123/501
[58] Field of Search ............. 123/305, 339, 340, 501, 123/73 C, 478

[56] References Cited

U.S. PATENT DOCUMENTS

| | | | |
|---|---|---|---|
| 2,724,371 | 11/1955 | Mallory | 123/501 |
| 2,746,441 | 7/1953 | Kremser | 123/501 |
| 3,196,859 | 7/1965 | Ziegler | 123/501 |
| 4,463,733 | 8/1984 | Isai | 123/501 |
| 4,807,572 | 2/1989 | Schlunke | 123/73 C |
| 4,955,341 | 9/1990 | Trombley et al. | 123/305 |

*Primary Examiner*—Raymond A. Nelli
*Attorney, Agent, or Firm*—Ernest A. Beutler

[57] ABSTRACT

A fuel injection system and control for a two cycle crankcase compression internal combustion engine wherein air and fuel are directly injected into the combustion chamber of the engine and the idle speed is maintained constant by varying the timing of fuel injection. Fine tuning of the idle speed is further accomplished by changing the duration of fuel injection under certain conditions.

25 Claims, 7 Drawing Sheets

FUEL INJECTION SYSTEM AND METHOD FOR ENGINE

BACKGROUND OF THE INVENTION

This invention relates to a fuel injection system and a method of injecting fuel in an internal combustion engine so as to provide better and more stable idle operation.

The advantages of direct cylinder injection are well known. It is also understood that direct cylinder fuel injection can be particularly useful in two cycle crankcase compression internal combustion engines as a method for controlling exhaust emissions and running characteristics. That is, direct cylinder injection can, under some circumstances, improve misfiring, uneven combustion and the emission of hydrocarbons. Although direct cylinder fuel injection can improve these characteristics, the direct cylinder injection systems and methods previously proposed have not been completely satisfactory in insuring good and stable idle speed.

One reason for this is that the engine speed is normally changed by adjusting the duration of fuel injection. It is difficult, however, to maintain the desired idle speed by adjusting primarily the fuel injection duration. That is, if the system is capable of maintaining good accuracy and reliability of idle operation, it will be difficult to provide the adequate amount of fuel through the entire range required for the injection system. As a result, there is normally a sacrifice in idle speed stability with injection systems of this type.

It is, therefore, a principal object of this invention to provide an improved fuel injection system and method for an engine and particularly for maintaining the idle speed of the engine constant.

It is a further object of this invention to provide an improved and simplified fuel and air injection system for an engine that will maintain good and stable idle speed under varying conditions.

SUMMARY OF THE INVENTION

This invention is adapted to be embodied in a fuel injection system for an internal combustion engine that comprises a fuel injector for supplying fuel directly to the combustion chamber of the engine. Sensing means are provided for sensing the idle speed of the engine. Means are provided for changing the time of start of injection of fuel from the fuel injector in response to variations in idle speed to maintain stability of the idle speed.

A further object of this invention is adapted to be embodied in a method of operating a fuel injection system for an internal combustion engine that includes a fuel injector for supplying fuel directly to the combustion chamber of the engine. In accordance with this invention, variations in the idle speed of the engine are sensed and the timing of initiation of injection is adjusted in response to the sensed speed variations to maintain the idle speed constant.

DETAILED DESCRIPTION OF THE PREFERRED EMBODIMENTS OF THE INVENTION

Figure 1:
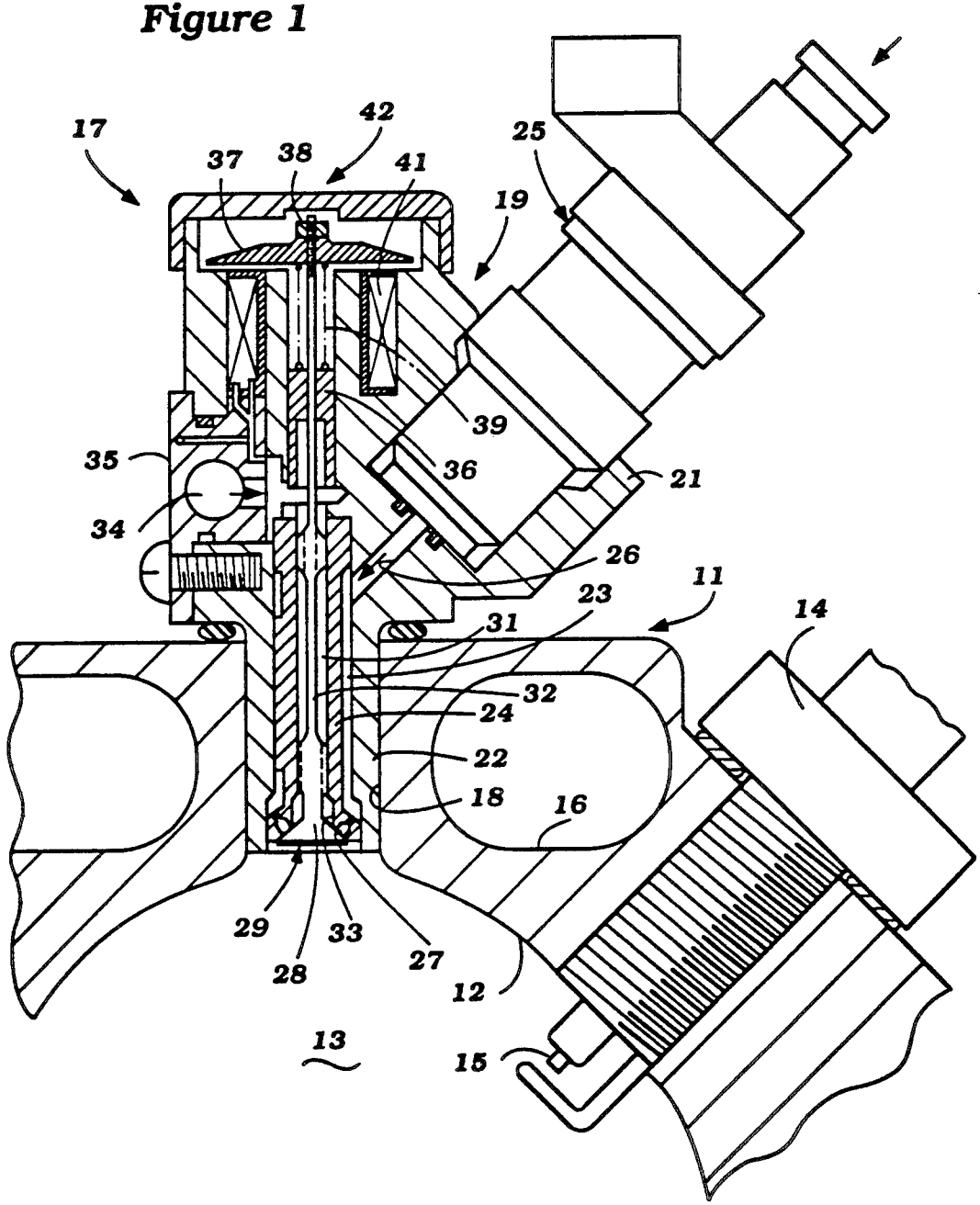
FIG. 1 is a partial cross sectional view taken through the combustion chamber of an engine having a fuel injection system construction and operated in accordance with an embodiment of the invention.

Referring first to FIG. 1, a portion of an internal combustion engine having a fuel injection system constructed and operated in accordance with the invention is partially depicted. Since the invention deals with the fuel injection system, illustration of the complete engine is not believed to be necessary in order to understand the construction and operation of the invention.

The engine depicted is of the two cycle crankcase compression type. Although the invention may be employed in conjunction with four cycle engines, it has particular utility in conjunction with two cycle engines due to the aforenoted difficulties in maintaining good running conditions under idle with such engines while maintaining the idle speed, combustion and exhaust emission within desired limits.

The engine includes a cylinder head 11 which has a recess 12 which defines partially a combustion chamber 13. The combustion chamber 13 is defined by the cylinder head recess 12, the head of the piston and the cylinder bore (not shown). A spark plug 14 is threaded into the cylinder head 11 and has its gap 15 disposed appropriately in the combustion chamber 13. A cooling jacket 16 is formed in the cylinder head 11 and coolant is circulated through this cooling jacket in a known manner for engine cooling.

A fuel injector, indicated generally by the reference numeral 17, is mounted within a bore 18 formed in the cylinder head 11. In the illustrated embodiment, the injector 17 is a fuel/air injector. It is to be understood, however, that the invention may be employed with other types of fuel injectors than air/fuel injectors. For example, the invention may be utilized with injectors that inject only fuel, but the invention has particular utility in conjunction with air/fuel injectors.

The injector 17 includes a body assembly 19 that includes a main housing portion 21 that has a cylindrical part 22 that is received within the bore 18. Preferably the bore 18 will be threaded and the cylindrical part 22 will be threaded so as to attach the injector 17 to the cylinder head 11.

The main body part 21 has a bore 23 in which a valve sleeve 24 is positioned. There is a gap between this bore 23 and the valve sleeve 24 so as to provide a chamber into which fuel is injected by a fuel injector 25. The injector 25 is mounted in the housing port 21 and communicates with this cavity through a delivery port 26.

The cavity terminates at its lower end in a valve seat portion in which a plurality of delivery ports 27 are positioned. A conical head 28 of an injection valve 29 opens and closes the ports 27 and, accordingly, communicates the fuel with the combustion chamber 13 when the valve 29 is open. The valve body 24 is also formed with a bore 31 and an air chamber is provided within the bore 31 by a reduced diameter portion 32 of the valve 29 and a further recess 33 formed in the valve member 24 adjacent its seat portion. Pressurized air is delivered to this chamber from an air inlet port 34 formed in a manifold 35 which is affixed suitably to the main body part 21 of the housing assembly 19 of the injector 17.

A valve guide 36 has a bore that receives the upper end of the stem portion 32 of the valve 29. An armature 37 is affixed to this stem portion by means of a nut 38. A coil compression spring 39 normally urges the valve 29 to its closed position as shown in FIG. 1. An electrical solenoid winding 41 is contained within an actuator portion 42 of the injector 17 and when energized, attracts the armature 37 and moves the control valve 29 to its open position so that fuel and air will be injected into the combustion chamber 13.

It is to be understood that the amount of fuel injected can be varied in a wide variety of manners and the operation of the fuel injector 25 may be initiated either before the valve 29 is opened or after. Any such control strategies are within the spirit and scope of the invention. Also, the air pressure delivered to the port 34 can also be varied as desired so as to change the fuel/air injection characteristics. Again, this particular part of the strategy is not critical to the invention and the invention may be utilized in conjunction with any wide variety of strategies of varying air pressure and/or the timing and duration of operation of the injector 25. As will be hereinafter noted, the effect of the operation of the method and structure incorporating the invention will depend upon the air pressure and the way fuel is delivered. This relationship will be described later.

Figure 2:
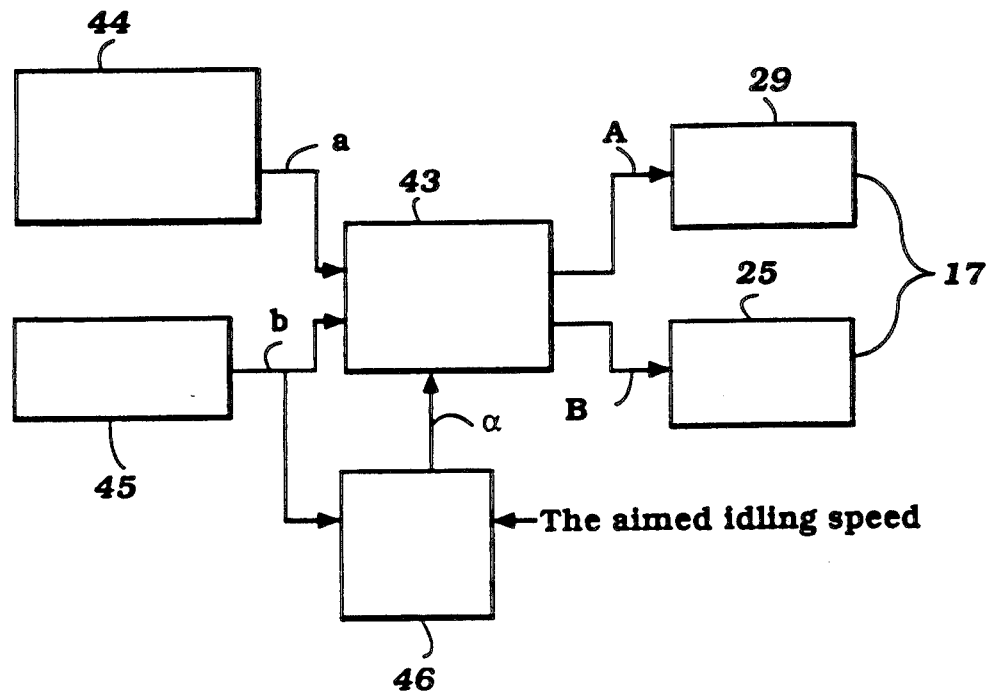
FIG. 2 is a schematic block diagram showing the components of the injection system.

Referring now to FIG. 2, the components of the system embodying the invention are shown schematically and will now be described. The reference numeral 43 indicates the control element for the air/fuel injector 17. This control element 43 controls the main control valve 29 of the injector 17 and also the fuel injector 25 of this injector. If desired, there may also be a control for air pressure. Although this is not particularly necessary, it may be utilized in conjunction with the invention.

There are provided two sensors for operating the controller 43. These include a throttle opening sensor 44 that determines the operator throttle setting of the engine and an engine speed sensor 45. The throttle opening sensor 44 outputs a signal a to the controller 43 while the engine speed detector 45 outputs a speed signal b. A fuel injection correction unit 46 receives both the engine speed signal b and also an input from a device that selects the desired idling speed in accordance with certain parameters such as the temperature, the accessory load on the engine and the like. This fuel injection timing corrector outputs a signal to the controller 43 for adjusting the initiation of fuel injection and the duration of fuel injection in accordance with a scheme which will be discussed later.

Basically, it is well known that the speed of the engine will depend directly on the amount of fuel injected, if all other factors are held constant. For the reasons as aforedescribed, however, it is not particularly desirable to attempt to control idle speed solely by varying the duration of fuel injection. However, it has been discovered that the amount of fuel injected for a given increment of duration of opening of the valve 29 will depend upon the timing when the valve 29 is initially opened. This may be understood by reference to FIGS. 3 and 4 which are graphic views showing the relationship of the actuation timing of the winding 41, the fuel pressure, the air pressure supplied by the port 34, the pressure within the cylinder and the amount of fuel injected. These relationships are shown in response to timing after bottom dead center or before top dead center. Furthermore, in these two graphs, the timing or duration of the injection signal is maintained constant and the air and fuel pressures are maintained constant. It is preferred that the fuel pressure be greater than the air pressure and it will be noted that compression pressure in the cylinder increases, as is well known, as the piston approaches top dead center.

Figure 3:
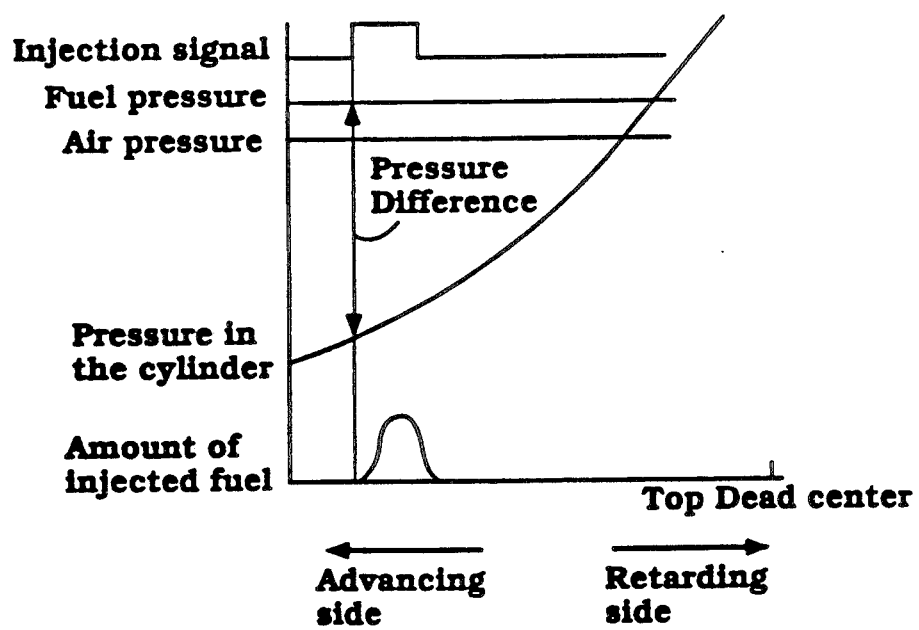
FIG. 3 is a graphic view showing the fuel delivery in relation to the injection timing, air pressure and fuel pressure characteristics under one running condition.
Figure 4:
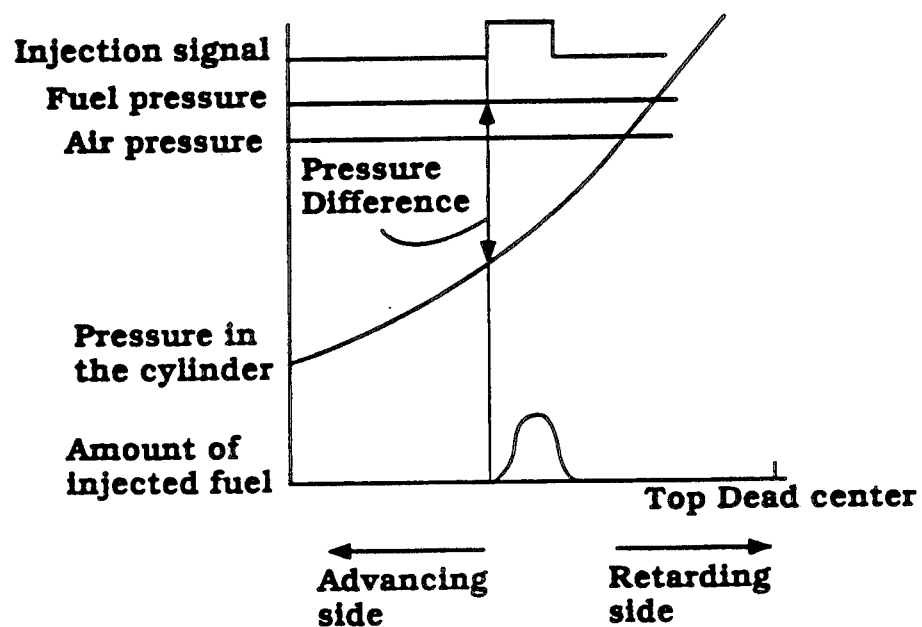
FIG. 4 is a graphic view, in part similar to FIG. 3, showing the characteristics during another phase of operation.
Figure 5:
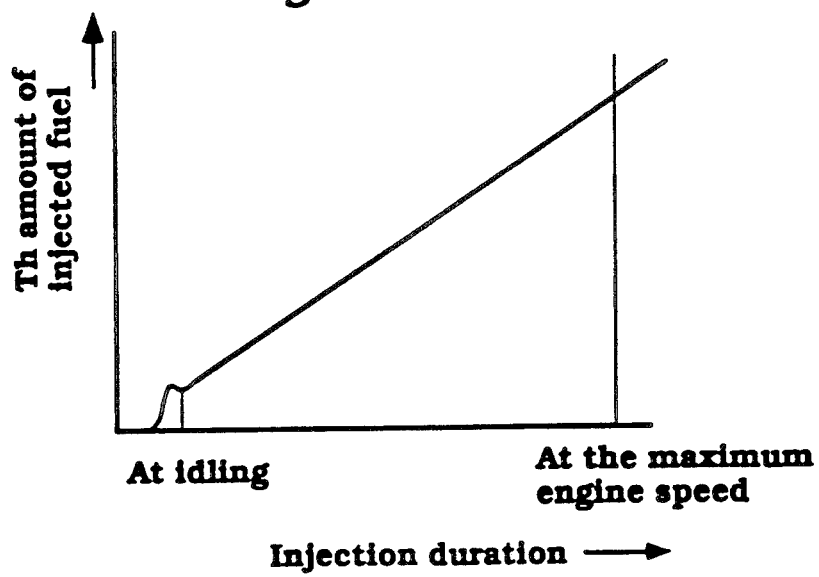
FIG. 5 is a graphic view showing the amount of fuel injection and the injection duration under all running speeds and conditions.

If the timing is early, as shown in FIG. 3, there will be a greater amount of fuel delivered for a given duration of opening of the valve 29 because the fuel and air enter into a lower pressure area than at the later timing as shown in FIG. 4. Therefore, in conjunction with a described control strategy and one of the preferred embodiment, the idle speed can be easily changed only by adjusting the timing of the initiation of fuel injection as opposed to the duration. Of course, as the engine speed increases above idle, then the injector duration is increased as shown in FIG. 5. This figure shows that the amount of fuel injected at idle can vary, but as the engine moves off idle, the amount of fuel injected is changed by changing the duration of opening of the valve 29. It is assumed under this condition that fuel injection by the injector 25 is governed by the entire time when injector valve 29 is open.

The injection duration at idle is set at a fixed amount which depends upon the desired engine speed. The initial air pressure is also set so that the fuel injection for the desired idling speed can be started before the pressure in the cylinder becomes too great so as to preclude fuel from being discharged when the valve 29 is open. This time is referred to as the time when the pressure curve is saturated. It should be obvious to those skilled in the art that if the fuel injection is delayed until just before top dead center, the only way adequate fuel can be delivered is by increasing substantially the injection and air pressures and this obviously raises the cost of the system significantly.

Figure 6:
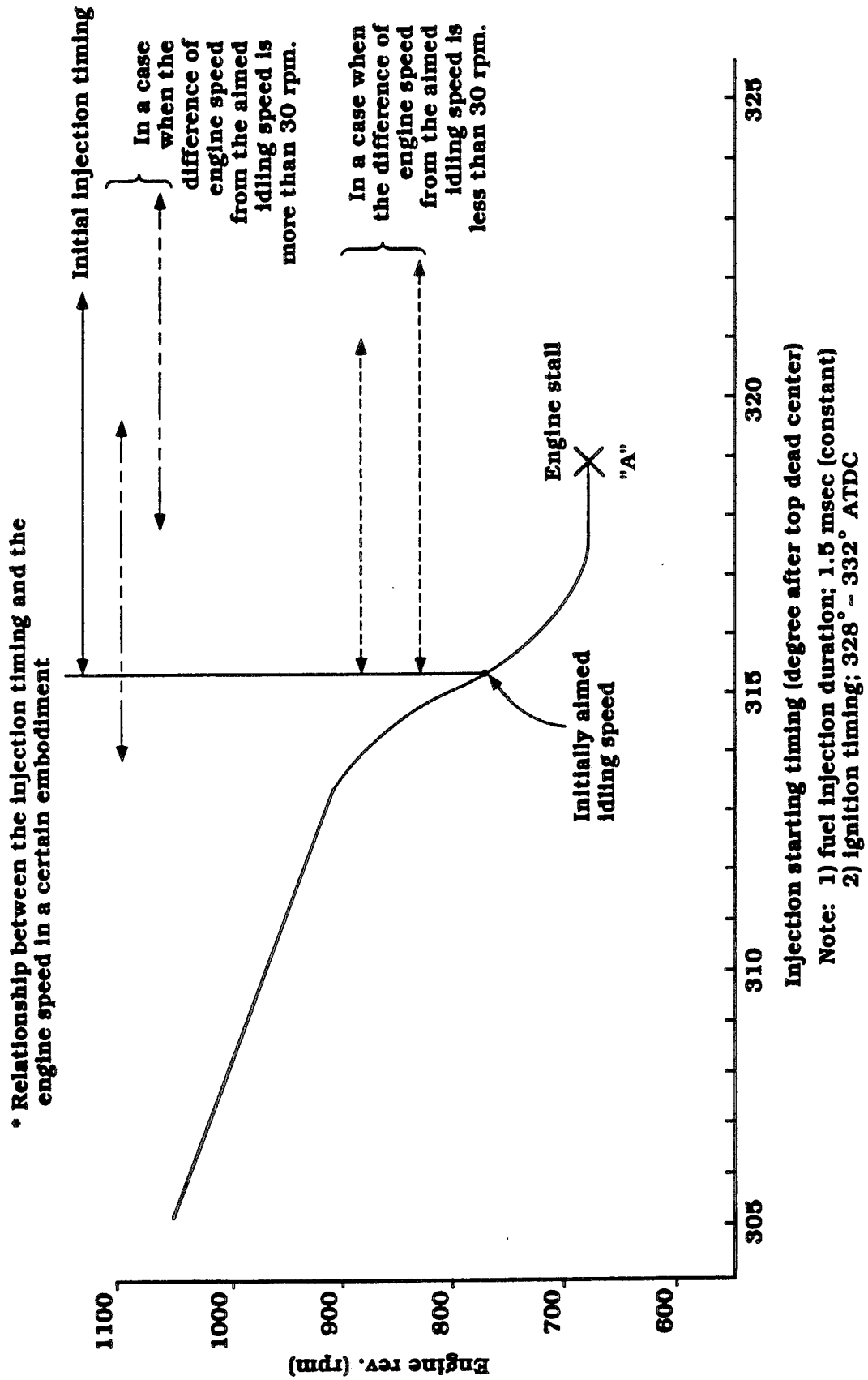
FIG. 6 is a graphic view showing how the starting of time of injection will vary idle speed even if the duration of fuel injection is maintained constant and also shows two different types of control routines.

FIG. 6 is a graphic view showing how the effect of varying the injection starting time will effect idle speed even if fuel duration is constant. In this regard, it should be noted that reference to the initiation of fuel injection and the duration refers to the time when the valve 29 is open and independent of the actuation of the fuel injector 25. That is, the invention is utilized in conjunction with systems where in the fuel is all precharged into the injector 17 before the valve 29 is opened or other control routines wherein the fuel is injected by the injector 25 only after the valve 29 is opened. The principles of the invention are the same regardless of the internal strategy under which the injector 17 operates.

Referring now to FIG. 6, this figure illustrates a specific example of the invention when the fuel injection duration is held constant at 1.5 milliseconds and ignition timing is approximately 328° to 332° after top dead center. It will be seen that as the starting time of injection is advanced, the idle speed increases significantly. There comes a point in time (the point A) when the pressure curve is saturated and the pressure in the combustion chamber is so high that fuel cannot be injected and the engine will stall.

In the illustrated embodiment, it is assumed that engine idle speed is desired to be held at about 750 rpm. Hence, initial injection timing is begun at approximately 315° after top dead center.

Figure 8:
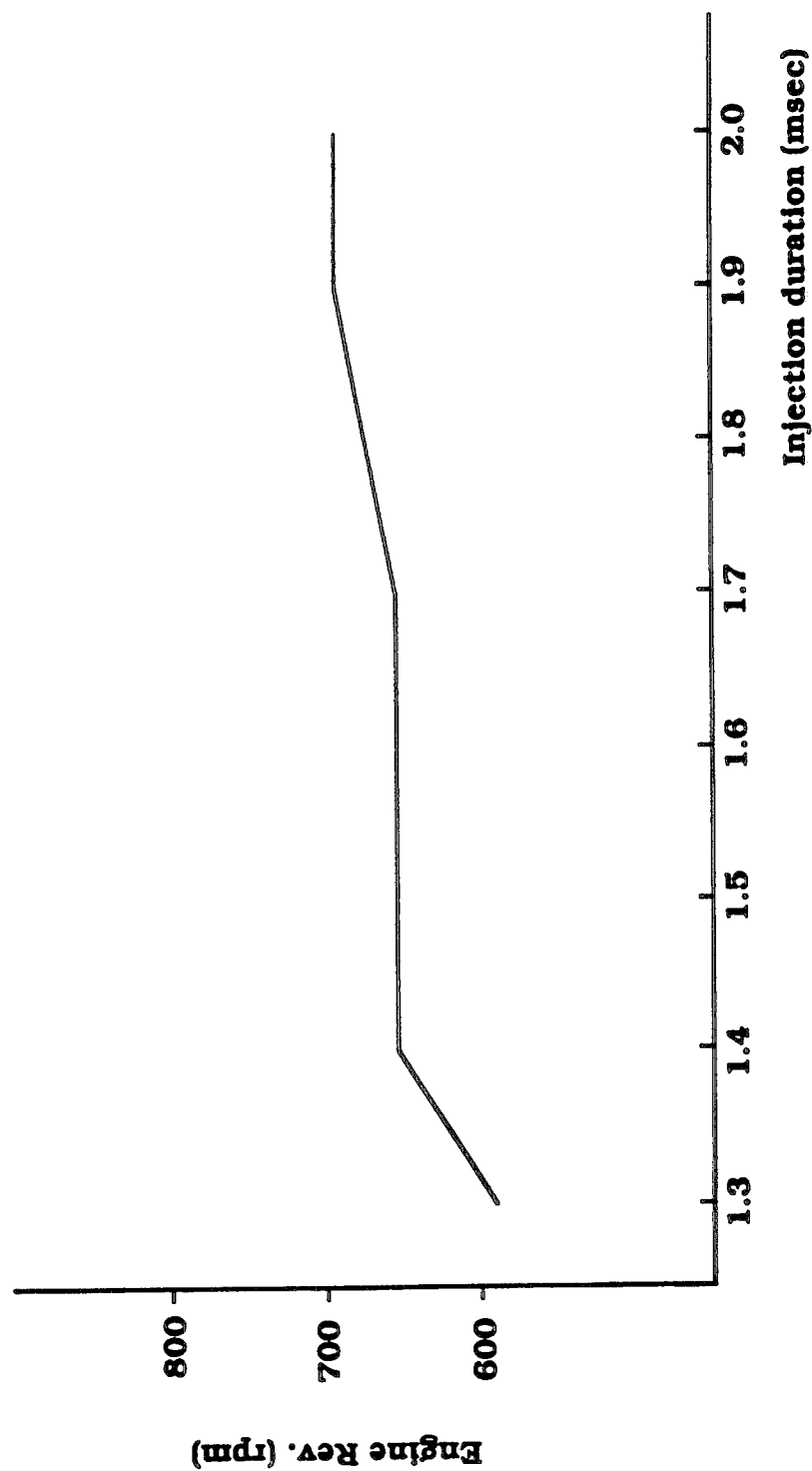
FIG. 8 is a graphic view showing how the duration of fuel injection effects idle speed when injection starting time is held constant.
Figure 9:
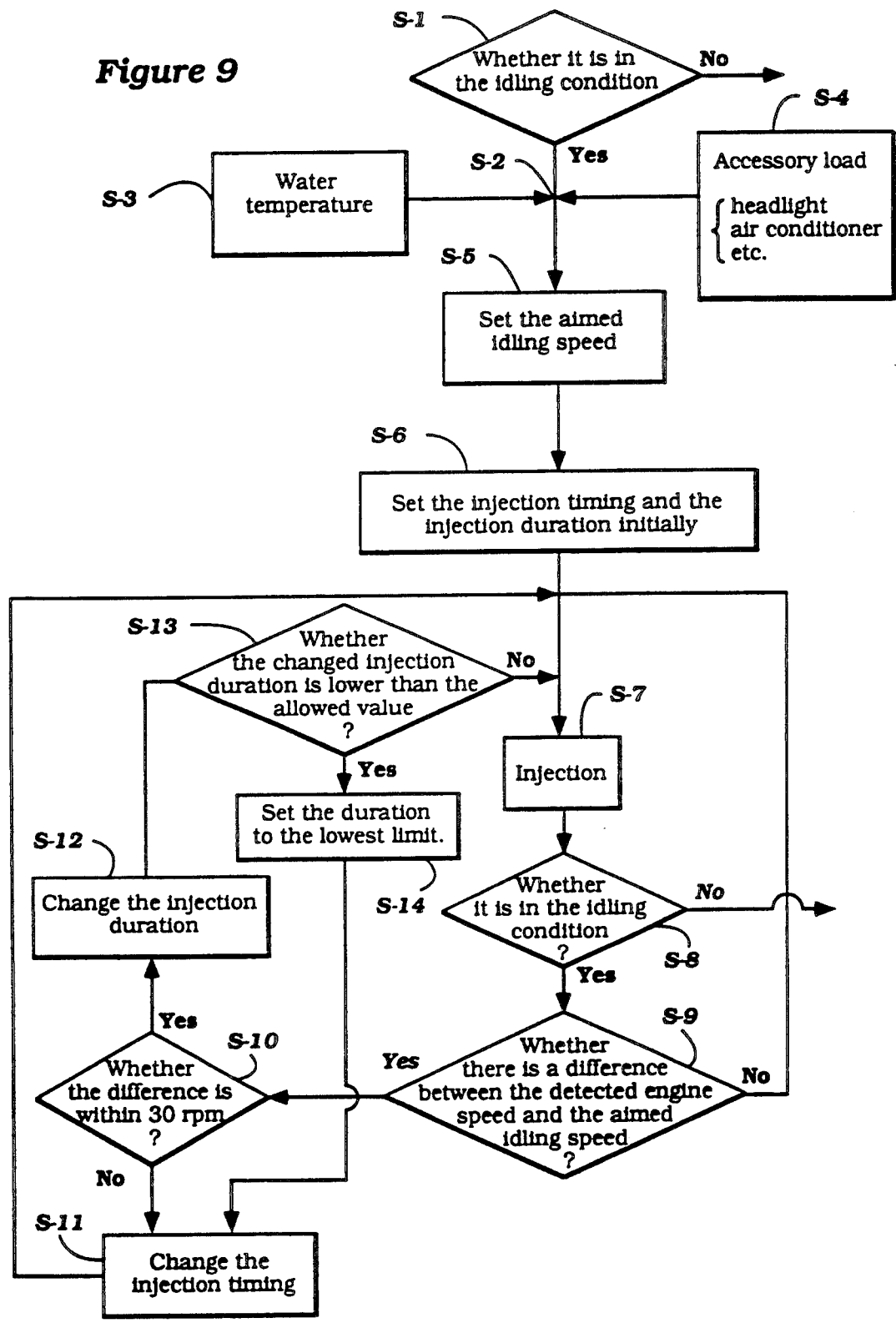
FIG. 9 is a block diagram showing a form of control routine which may be utilized in conjunction with the invention.

FIG. 8 shows two timing curves. The normal idling curve indicated at N and an idling curve indicated at B1 which indicates an advance fuel injection timing so as to increase idle speed when the idle speed is too low and a retarded curve A1 which is the case when the idle speed is higher than the control speed. As a result of this variation and for the reasons as aforenoted, it is possible to control the idle speed in a very accurate manner.

It has been found that when the idle speed varies from the set speed by more than a predetermined amount, for example, more than 30 rpm when the desired idle speed is in the range of 750 rpm, then it is more desirable to adjust the idle speed by adjusting the initiation of injection timing and not the amount of fuel injected. If the idle speed variation is less than 30 rpm at this speed range, then it is preferable to adjust or fine tune the idle speed by changing the injection duration.

Figure 7:
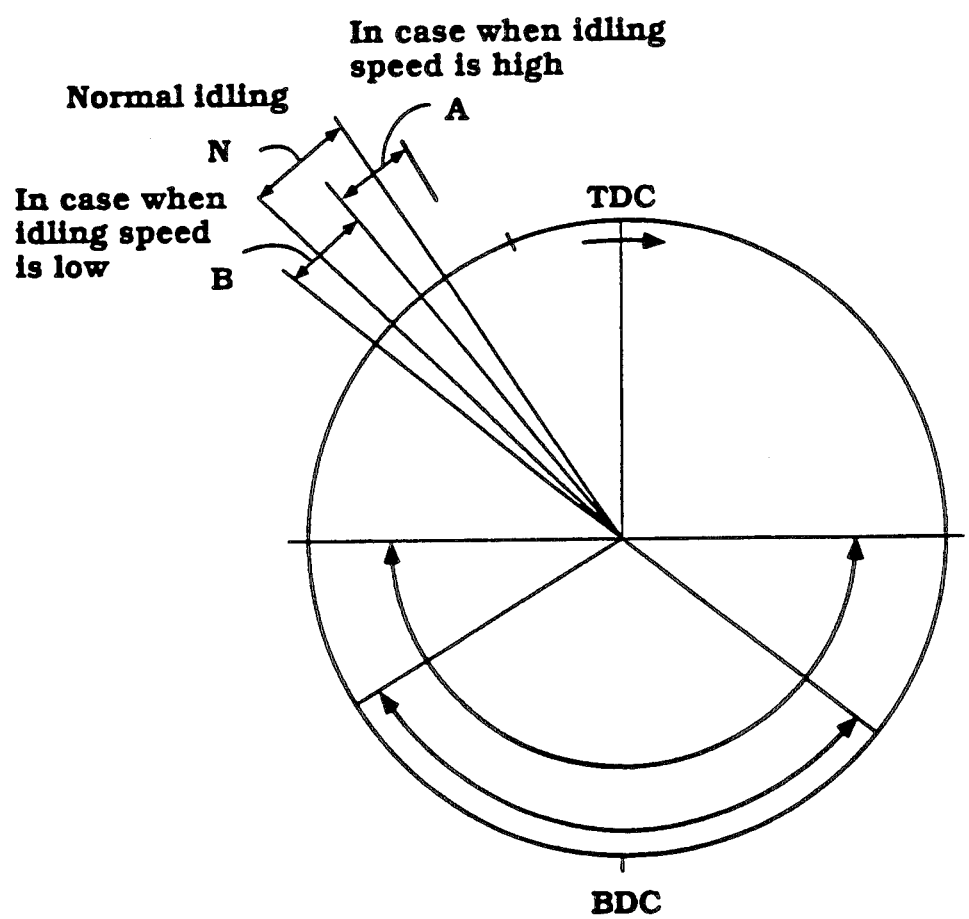
FIG. 7 is a timing curve showing the fuel injection initiation and duration under idle conditions.

FIG. 7 illustrates how idle speed can be fine tuned by changing injection duration. This is a figure showing engine speed in relation to injection duration and assuming that injection starting timing is held constant at 315° after top dead center. It will be seen from this curve that variations in injection duration can achieve fine changes in engine idle speed. Therefore, and again referring to FIG. 6, if the engine speed varies by more than 300° rpm, in a typical embodiment, then the idle stability is achieved by changing the injection timing as shown at the upper dot-dash portion of this curve. If, however, the engine speed difference is less than 30 rpm, then the engine speed is controlled by changing the duration of fuel injection as shown by the lower dotted control curve.

FIG. 8 shows a scheme by which the aforenoted features can be utilized in order to control idle speed. It is to be understood that this is just one control routine that may be practiced in conjunction with the invention and that other routines are possible.

Referring now specifically to FIG. 8, at the step S1 the controller 43 makes a determination of whether or not the engine is in its idle condition. This can be done by determining the position of the throttle valve sensor 44. If the throttle valve is at its closed or idle condition, then the program moves forward from the step S1. If it is not, the program merely repeats. If at the step S1 it is determined that the engine is in the idling condition, then at a point S2 certain parameters of the engine which will determine the desired idle speed are sensed. These may constitute water temperature and accessory load, determined at the points S3 and S4. The accessory load may be such features as headlights, air conditioning compressor, power steering, et cetera, all of which tend to reduce the idle speed of the engine and require a higher speed due to the load required to drive these accessories. These features are all preprogrammed into the control unit 46 that preprograms the aimed idling speed into the controller 43.

The program then moves to the step S5 so that the desired idle speed is set by the input from the unit 46. Then the injection timing and the injection duration are initially set at the step S6. During a cycle of operation, the program then moves to the step S7 so as to accomplish fuel injection. The program then moves to the step S8 to determine whether the engine is still in the idling condition by checking the condition of the throttle valve by the sensor 44. If the operator has called for a change in speed, then the program repeats back to the start to again begin the routine only when an idling condition is again sensed.

If the engine is still in the ideal condition at the step S8, the program moves to the step S9 to determine whether there is a difference between the engine speed detected by the detector 45 and the desired idle speed. If there is not, the program moves back to the step S7 and continues injection at the previously set rate.

If it is determined at the step S9 that the actual engine speed is not the desired idle speed, then the program moves to the step S10 to determine the amount of speed difference. The comparison is made, in the previously described example, whether or not the idle speed varies from the desired idle speed by less than 30 rpm. If it is not, then the program moves to the step S11 so as to change the injection timing (the point at which the injection valve 29 is initially opened). This is done without changing the duration of the fuel injection. Then the program moves again to the step S7 and begins injection again, but at the changed injection timing.

If at the step S10 it is determined that the engine speed variation is less than 30 rpm, then the program moves to the step S12 so as to set a change in the duration of the opening of the injection valve 29 without changing the timing of start of injection. The program then moves to the step S13 to determine if the duration called for is lower than the minimum duration set for the injector 17. If it is lower than that possible, the program moves to the step S14 to set the duration to the lowest limit, assuming that it is not already been set at that limit and the program moves to the step S11 to adjust the injection timing. If at the step S13 it is determined that the injection duration called for is not below the lowest limit, then the program moves to the step S7 and commences injection at the previously set time, but for a different duration.

It should be readily apparent from the foregoing description that the described invention is particularly adapted in providing description is only that of a preferred embodiment of the invention. Various changes and modifications may be made, including some of those described, without departing from the spirit and scope of the invention, as defined by the appended claims. In the claims and as previously noted in the specification, the term "start of injection" as used herein refers to the time when the introduction of fuel into the combustion chamber begins. In the illustrated embodiment, this occurs when the valve 29 is open and regardless of the strategy of the operation of the fuel injector 25.

We claim:

1. A fuel injection system for an internal combustion engine comprising a fuel injector for supplying fuel directly to the combustion chamber of said engine, sensing means for sensing the idle speed of said engine, and means for changing the timing of the start of injection of fuel from said fuel injector in response to variations from the desired idle speed to maintain stability in the idle speed.

2. A fuel injection system as set forth in claim 1 wherein only the injection timing is adjusted to maintain idle speed within at least a certain speed range variation.

3. A fuel injection system as set forth in claim 2 wherein a greater than a predetermined variation from the desired idle speed is necessary in order for the speed to be maintained through adjustment of the timing of the start of injection.

4. A fuel injection system as set forth in claim 3 further including means for changing the duration of fuel injection to maintain idle speed in speed range of variations other than that greater than the predetermined variation.

5. A fuel injection system as set forth in claim 4 wherein the injection timing is advanced if the idle speed is blow the low end of the predetermined variation and retarded if the idle speed is above the high end of the predetermined variation.

6. A fuel injection system as set forth in claim 1 wherein the injection timing is advanced if the idle speed is blow the desired idle speed and retarded if the idle speed is above the desired idle speed.

7. A fuel injection system as set forth in claim 6 further including means for changing the duration of fuel injection to maintain idle speed in a speed range of variations greater than a predetermined range from the desired idle speed.

8. A fuel injection system as set forth in claim 1 wherein the timing of injection is varied by varying the point in the cycle at which an injection valve of the injection nozzle is opened.

9. A fuel injection system as set forth in claim 8 wherein only the injection timing is adjusted to maintain idle speed within at least a certain speed range variation from the desired idle speed.

10. A fuel injection system as set forth in claim 9 wherein a greater than a predetermined variation from the desired idle speed is necessary in order for the speed to be maintained through adjustment of the timing of the start of injection.

11. A fuel injection system as set forth in claim 10 further including means for changing the duration of fuel injection to maintain idle speed in speed range of variations other than the predetermined variation.

12. A fuel injection system as set forth in claim 11 wherein the injection timing is advanced if the idle speed is below the low end of the predetermined variation and retarded if the idle speed is above the high end of the predetermined variation.

13. A fuel injection system as set forth in claim 8 wherein the injection timing is advanced if the idle speed is below the low end of the predetermined variation and retarded if the idle speed is above the high end of the predetermined variation.

14. A fuel injection system as set forth in claim 13 wherein only the injection timing is adjusted to maintain idle speed within at least a certain speed range variation.

15. A fuel injection system as set forth in claim 8 wherein the fuel injector also injects pressurized air into the engine and the opening of the injection valve controls the delivery of both air and fuel.

16. A fuel injection system as set forth in claim 15 wherein only the injection timing is adjusted to maintain idle speed within at least a certain speed range variation from the desired idle speed.

17. A fuel injection system as set forth in claim 16 wherein a greater than a predetermined variation from the desired idle speed is necessary in order for the speed to be maintained through adjustment of the timing of the start of injection.

18. A fuel injection system as set forth in claim 17 further including means for changing the duration of fuel injection to maintain idle speed in a speed range of variations other than the predetermined speed range.

19. A fuel injection system as set forth in claim 18 wherein the injection timing is advanced if the idle speed is below the low end of the predetermined variation and retarded if the idle speed is above the high end of the predetermined variation.

20. A fuel injection system as set forth in claim 19 herein the injection timing is advanced if the idle speed is below the low end of the predetermined variation and retarded if the idle speed is above the high end of the predetermined variation.

21. The method of controlling the fuel injection to a two cycle crankcase compression internal combustion engine comprising the steps of injecting fuel directly into the combustion chamber, measuring the actual idle speed of the engine, determining the variation from desired idle speed, and changing the time of the start of injection to maintain idle speed constant.

22. A method as set forth in claim 21 wherein only the injection timing is adjusted to maintain idle speed within at least a certain speed range variation from the desired idle speed.

23. A method as set forth in claim 22 wherein a greater than a predetermined variation from the desired idle speed is necessary in order for the speed to be maintained through adjustment of the timing of the start of injection.

24. A method as set forth in claim 23 further including means for changing the duration f fuel injection to maintain idle speed in a speed range of variations other than the predetermined speed range.

25. A method as set forth in claim 24 wherein the injection timing is advanced if the idle speed is below the low end of the predetermined variation and retarded if the idle speed is above the high end of the predetermined variation.

* * * * *